United States Patent [19]

Invernizzi et al.

[11] Patent Number: 4,506,027
[45] Date of Patent: Mar. 19, 1985

[54] METHOD OF PREPARING A SUPPORTED ZIEGLER-CATALYST FOR THE POLYMERIZATION OF ALPHA-OLEFINS

[75] Inventors: Renzo Invernizzi, Milan; Ferdinando Ligorati, Usmate, both of Italy

[73] Assignee: Enichimica Secondaria S.p.A., Palermo, Italy

[21] Appl. No.: 550,422

[22] Filed: Nov. 10, 1983

[30] Foreign Application Priority Data

Nov. 11, 1982 [IT] Italy ................ 24177 A/82

[51] Int. Cl.$^3$ ............ C08F 4/64; C08F 4/02
[52] U.S. Cl. ................ 502/9; 502/111; 502/113
[58] Field of Search ............ 502/9, 111, 113

[56] References Cited

U.S. PATENT DOCUMENTS

| 3,745,154 | 7/1973 | Kashiwa | 502/113 X |
| 4,111,835 | 9/1978 | Foschini et al. | 502/9 |
| 4,208,304 | 6/1980 | Fahey | 502/111 |
| 4,316,818 | 2/1982 | Welch et al. | 502/111 X |
| 4,333,851 | 6/1982 | Spearman et al. | 502/113 |
| 4,376,062 | 3/1983 | Hamer et al. | 502/9 |
| 4,410,451 | 10/1983 | Dietz et al. | 502/111 X |

Primary Examiner—Patrick Garvin
Attorney, Agent, or Firm—Sughrue, Mion, Zinn, Macpeak, and Seas

[57] ABSTRACT

Method of preparing a supported Ziegler-catalyst active in the polymerization of alpha-olefins to polymers particularly suited to working by blow-moulding, by reacting:

(A) an organometallic compound of aluminium, and
(B) the product of the reaction of titanium and vanadium halides with a solid support obtained by the spray drying of magnesium chloride in a mixed solution of ethanol and methanol, the support containing both ethanolic and methanolic alcoholic hydroxyl groups.

8 Claims, No Drawings

METHOD OF PREPARING A SUPPORTED ZIEGLER-CATALYST FOR THE POLYMERIZATION OF ALPHA-OLEFINS

The present invention relates to a method of preparing a supported Ziegler-catalyst active in the polymerisation of alpha-olefins to polymers having multi-index values of from 0.08 to 0.5 g/10', absolute densities of from 0.94 to 0.96 g/ml and shearing stress sensivities ($Q_F$) greater than or equal to 80, which are particularly suited to working by blow-moulding. The invention also relates to the method of preparing the active support.

It is known in the art that it is possible to polymerise ethylene, and alpha-olefins in general, with a Ziegler-catalyst generally constituted by a hydride or an organometallic compound of the elements in groups I to III and by a compound of a transition metal belonging to groups IV to VI of the periodic system. It is also known that it is possible to deposit the transition metal compound on, or link it to, a solid granular support.

A support which is particularly suitable for Ziegler-type catalysts is constituted by the solid, microspheroidal product of the spray drying of ethanolic solutions of magnesium chloride, as described in Italian Patent Application No. 21881-A/81 of the 5/21/81 which corresponds to U.S. Pat. No. 4,421,674.

Such a support, which contains residual ethanolic alcohol groups, reacts easily with a titanium halide, especially titanium tetrachloride, to give a catalytic component which is suitable for the polymerisation of ethylene with a high activity and which gives a polymer in the form of substantially uniform particles.

Ethylene polymers obtained according to the said Italian Patent Application have a relatively restricted distribution of molecular weights, which makes them useful for working by such methods as injection moulding.

It is currently felt that there is a need to provide ethylene polymers on the market which have a wide distribution of molecular weights such that they are suitable for working by the blow-moulding technique.

More particularly, there is a need for ethylene polymers with values of the shearing stress sensitivity ($Q_F$) greater than or equal to 80. By the shearing stress sensitivity ($Q_F$) is meant the ratio between the melt-index at 21.6 kg and the melt-index at 2.16 kg measured at 190° C. The $Q_F$ value is connected to the molecular weight distribution in the sense that the higher the $Q_F$ value the wider the distribution of molecular weights. Polyethylenes which are more preferable for blow-moulding have $Q_F$ values above about 100.

It is thought that the reaction between a spray-dried solid magnesium chloride support and a transition metal compound gives rise to the formation of a heterogeneous link between the solid support and the transition metal compound and that this heterogeneous link is acting as a centre of catalytic activity in the final Ziegler-catalyst.

If in the activated supports a multiplicity of such heterogeneous links is present, the final supported Ziegler-catalyst contains various centres of catalytic activity.

The present invention is based on the finding that the formation of olefinic polymers or copolymers with wider molecular-weight distribution is favoured by the presence in the supported Ziegler-catalyst of a multiplicity of heterogeneous links.

In particular it is found that it is possible to obtain a multiplicity of the said heterogeneous links both by preparing a solid support of magnesium chloride from a solution in two different alcohols and by activating the said solid support by reacting it with more than one transition metal compound.

Accordingly, the present invention relates to the preparation of a supported Ziegler-catalyst by reacting (A) an organometallic compound of aluminium, and (B) the product of the reaction of a titanium halide and a vanadium halide, with a solid support obtained by the spray-drying of magnesium chloride in a mixed solution of ethanol and methanol, the said support containing both ethanolic and methanolic alcoholic hydroxyl groups.

The support obtained by the spray drying typically contains a quantity of alcohol groups of from 2% to 30% by weight, expressed as the sum of the ethanol and methanol contents, with a weight ratio between the two of from 0.5:1 to 2.5:1.

Moreover the component B of the catalytic system contains a quantity of titanium and vanadium of from 0.7 to 12% by weight. The best results are obtained by keeping a titanium/vanadium weight ratio in the component B of the catalytic system within a range of values of from 0.5:1 to 2.5:1.

In the case of the copolymerisation of ethylene with propylene or 1-butene, these latter are used in measured quantities such as to give ethylene copolymers with short chain branching contents of the order of 1 to 2% by weight, determined by infra red.

According to a preferred embodiment, the polymerisation of the ethylene, or its copolymerisation with propylene or 1-butene is carried out in two polymerisation stages in series, with different conditions from each other, as will be described below.

The catalytic system of the present invention displays a high activity in the preparation of ethylenic polymers or copolymers for blow-moulding, such that it is not necessary to remove residual catalyst from the polymer at the end of the polymerisation. Moreover, given the particular form of the component B of the catalytic system, ethylenic polymers or copolymers are obtained directly from the polymerisation in the form of uniform granules and the fusion and granulation treatments are not required.

PREPARATION OF THE SUPPORT

The support for the catalyst is prepared, according to the present invention, by spray drying a solution of magnesium chloride in a mixture of ethanol and methanol. For this purpose magnesium chloride which is anhydrous or essentially anhydrous (total water content less than about 2% by weight), obtainable commercially in the form of powders, granules or flakes, is used. The solution for spray drying is generally prepared by dissolving the magnesium chloride in a solution of ethanol and methanol in quantities less than or equal to those needed to saturate the solution at the operating temperature and pressure. The ethanol/methanol weight ratio in the solution depends on the desired content of ethanolic and methanolic hydroxyl groups in the support and generally varies from 0.5:1 to 2.5:1.

It is known that spray drying is a technique whereby a solution of a solute in a vaporizable solvent, or mixture of vaporizable solvents, is sprayed to form liquid droplets which are brought into content with a hot, inert gas (unreactive) flowing in the same direction, in counter-flow or in counter-equi-flow so as to evaporate the solvent or mixture of solvents and cause the solute to separate out as solid particles, generally of a uniform, spherical form.

In the spray drying of mixed solutions according to the present invention, the operative conditions (such as the temperature of the gas at the inlet and at the outlet and the rate of flow of the gas and of the solution) are regulated so that the solid recovered has a total content of residual alcohol groups of from 2 to 30% by weight (expressed as the sum of ethanol and methanol) with a weight ratio of the ethanol to the methanol within the range 0.5:1 to 2.5:1. Outside this range the heterogeneity of the links formed in the subsequent reaction with the titanium and vanadium halides, is not, in fact, sufficient.

All the parameters for the spray drying of the solutions of the present invention cannot be predetermined in that, other conditions being equal, they depend on the manner in which the gas and the solution are brought into contact, the geometry of the apparatus, its efficiency and other matters.

The main spray-drying parameters for a typical embodiment of the invention are as it follows:

magnesium chloride is added to a mixed solvent of ethanol and methanol in a weight ratio of from 0.5:1 to 2.5:1 and the mixture is heated under pressure in an inert gas (generally nitrogen) until a solution is formed containing from 100 to 1,000 g of magnesium chloride per 1,000 g of total alcohol;

this solution is fed to a spray drier which converts the solution into liquid droplets by means of a nozzle or other equivalent device located at the bottom of a vertical evaporation chamber, and the droplets are brought into contact with an equicounterflow of very pure, hot, gaseous nitrogen (water content less than 5 ppm) fed to the top of the evaporation chamber;

the temperature of the nitrogen flow of the inlet is of the order of 280° C. to 400° C. and at the outlet is from 150° C. to 220° C., with a temperature difference between the inlet and the outlet of at least 50° C. degrees.

With the above range of conditions, a solid separates in a cyclone located at the bottom of the drier and constitutes the support for the catalyst, the characteristics of which are within the following ranges of values:

particle form-spherical with a size of from 10 to 100 microns, 80% or more of the particles having a difference in dimensions within a range of 20 microns;
apparent density of the particles: from 0.1 to 0.6 g/ml;
total acolholic hydroxyl content; from 2 to 30% by weight (expressed as a sum of ethanol and methanol);
ethanol/methanol weight ratio in the support; from 0.5:1 to 2.5:1;
specific surface: greater than or equal to 3 m²/g;
pore radius: distributed within a range of from 100 to 3,000 Angstroms.

The support obtained shows two major peaks at 10.2 and 11.4 Angstroms under examination by X-ray diffraction.

This crystallographic pattern is surprisingly different from that of the solid support obtained by the spray-drying both of an ethanolic solution or of a methanolic solution of magnesium chloride.

PREPARATION OF THE COMPONENT B OF THE CATALYTIC SYSTEM

According to one preferred embodiment of the present invention the component B of the catalytic system is prepared by bringing the support, prepared as described under the preceding heading, into contact with and reacting it with a mixture of a halogenated compound of titanium and a halogenated compound of vanadium, the reaction possibly being carried out in the presence of an inert diluent.

Typical preferred inert diluents are liquid paraffinic hydrocarbons, having from 5 to 15 carbon atoms.

Titanium tetrachloride and titanium tetrabromide, preferably the former, are useful for this purpose, while preferred vanadium compounds are vanadium tetrachloride and vanadium oxychloride.

Reaction times of from 2 to 120 minutes, at ambient temperatures (20° to 25° C.) up to about 120° C. are generally required to fix a quantity of titanium and vanadium of from 0.7 to 12% by weight, expressed in terms of sum of the metals, in the component B.

In a preferred embodiment, the component B contains from 1.5 to 5% by weight of titanium and vanadium again expressed as the sum of the metals.

Other conditions being equal, the highest values of the shearing stress sensitivity ($Q_F$) of the ethylenic polymers or copolymers are obtained by using a component B of the catalytic system in which the titanium/vanadium weight ratio is from 0.5:1 to 2.5:1. According to another embodiment, the support is first reacted with the halogenated titanium compound, within the range of conditions given above, until the desired quantity of titanium is fixed; the intermediate thus obtained is then brought into contact with and reacted with a halogenated vanadium compound to fix the desired quantity of vanadium to the same support. In this second reaction phase reaction times of from 20 to 120 minutes and reaction temperatures of 60° C. to 120° C. are generally preferred.

In each case the component B of the catalytic system is obtained with characteristics which are typically as follows:

form and dimensions of the particles: similar to those of the support;
total content of titanium and vanadium: from 0.7 to 12% by weight, preferably from 1.5 to 5% by weight, expressed in terms of the sum of the metals;
porosity: greater than or equal to 0.7 ml/g;
specific surface: greater than or equal to 50 m²/g.

COMPONENT A OF THE CATALYTIC SYSTEM

The component A of the catalytic system is constituted by an alkyl aluminium or an alkyl aluminium halide such as $Al(C_2H_5)_3$, $Al(isoC_4H_9)_3$ and $Al(C_2H_5)_2Cl$. The best results are obtained with the trialkyl-aluminium compounds, particularly those in which the alkyl radical contains from 2 to 4 carbon atoms.

THE CATALYTIC SYSTEM

The catalytic system of the present invention is finally obtained by contacting the components A and B described above in quantities such as to ensure in the mixture an aluminium/(titanium+vanadium) atomic ratio of more than about 40/1 even though the atomic ratio may vary generally within the range 10:1 to 1,000:1.

The mixing is generally carried out in a solvent which is inert (unreactive) towards the constituents of the catalytic system, for example in the same solvent as that used for the polymerisation medium. Moreover the mixing may be carried out outside the polymerisation medium or within the medium itself.

THE POLYMERISATION

The catalytic system obtained by the method of the present invention is active in the polymerisation of ethylene and in the copolymerisation of ethylene with small quantities of propylene or 1-butene.

In general, the polymeration is carried out in suspension in a suitable liquid medium such as heptane, hexane, or cyclohexane, at relatively low pressures, generally less than 10 kg/cm$^2$, and typically of the order of 5 kg/cm$^2$, and at a temperature within the range 50° to 97° C.

In the preferred embodiment, the polymerisation is carried out continuously in two separate stages in series. More particularly, in the first stage the ethylene is polymerised at 60° C. to 95° C., preferably 70° C. to 90° C., under a total pressure of from 5 to 9 kg/cm$^2$, to form a prepolymer having a melt-index of 18 to 30 g/10', preferably 20 to 24 g/10'. In the second stage the ethylene is copolymerised with propylene or 1-butene in the presence of the prepolymer formed in the first stage, at temperatures of 50° C. to 75° C., preferably 55° C. to 65° C., under a total pressure of 2.45 kg/cm$^2$ and with 2% to 12%, preferably 5% to 10%, of propylene or 1-butene comonomer being kept in the gaseous phase. The ratio by weight of the prepolymer produced in the first stage to the polymer produced in the second stage is kept at 0.8:1 to 1.5:1 (preferably of the order of 1.1:1–1.4:1) and an ethylenic copolymer is obtained with a very high value of the shearing stress sensitivity ($Q_F$) compared with that obtained when the reaction is carried out in a single stage.

In general, with the use of the catalytic system of the present invention within the range of conditions defined above, ethylenic polymers are obained which are suitable for working by the blow-moulding technique, which have melt-index values of from 0.08 to 0.5 g/10', usually of the order 0.2–0.3 g/10', absolute densities of 0.94–0.96 g/ml, usually of the order of 0.955×0.003 g/ml, and relatively wide molecular weight distributions corresponding to values of the shearing stress sensitivity ($Q_F$) greater than or equal to about 80 and, under the best conditions, greater than about 100. In the case of the copolymerisation of ethylene with propylene or 1-butene, the copolymers obtained, as well as having general characteristics within the ranges indicated above, have short chain branching values of the order of 1–2%. The experimental examples which follow are illustrative and non-limiting of the invention.

EXAMPLE 1

Preparation of the support

60 Kg of ethanol, 40 Kg of methanol and 100 Kg of commercial magnesium chloride having a water content of less than about 2% by weight are loaded into a steel autoclave.

The mass is agitated and heated under pressure in nitrogen to 100° C. until a solution is obtained. The weight ratio of the total alcohol content to the magnesium chloride in the solution is thus equal to one, and the ethanol/methanol ratio is 1.5. The solution obtained is fed, at the temperature specified above, to a NIRO CLOSE CYCLE SPRAY DRIER. In this apparatus the solution is broken down into liquid droplets by means of a hydraulic nozzle, with a diameter of 0.7 mm and with a spray cone angle of 60°. The supply pressure is 9 kg/cm$^2$ and the hourly flow rate of the solution is 20 liters/hour. The apparatus is operated with a temperature of the nitrogen flow at the outlet of 200° C. and with a nitrogen flow rate of 200 m$^3$/hour, evaluated at the outlet from the dryer.

Thus a granular solid is formed with spherical particles 80% of which have a diameter within a range of 50 to 60 microns. The other characteristics of the particles are:
apparent density: 0.3 g/ml
alcoholic hydroxyl group content: 14.2% by weight as ethanol and 7% by weight as methanol, with an ethanol/methanol weight ratio of 2:1.
specific surface: 8 m$^2$/g
porosity: 0.85 ml/g
pore radius: from 100 to 30,000 Angstroms.

PREPARATION OF THE COMPONENT B OF THE CATALYTIC SYSTEM 1,000 grams of the support, obtained as described above, are placed in 1,000 ml of anhydrous C$_{10}$ liquid paraffin containing 100 ml of titanium tetrachloride. The weight ratio of the titanium tetrachloride to the support is thus about 0.17. The mass is heated to 100° C. for 15 minutes. At the end of this treatment the solid is filtered while hot and washed with C$_{10}$ liquid paraffin until the chlorine has disappeared from the filtrate.

Thus an intermediate for the component B of the catalytic system is obtained with the following characteristics:
form and dimensions of the particles similar to those of the support
titanium content: 2.4% by weight expressed in terms of the metal
specific surface: 64 m$^2$/g
porosity: 0.8 ml/g.

The intermediate thus obtained is suspended in 1,000 ml of C$_{10}$ liquid paraffin containing 100 ml of vanadium tetrachloride. The weight ratio of the vanadium tetrachloride to the support is thus about 0.18 and the weight ratio of the titanium tetrachloride to the vanadium tetrachloride used in the two treatments is about 0.95.

The mass is heated for one hour to 115° C. and after this period of time the solid is filtered off and washed with C$_{10}$ liquid paraffin.

Thus the component B of the catalytic system is obtained with the following characteristics:
titanium content: 2% by weight
vanadium content: 0.9% by weight
titanium/vanadium weight ratio: 2.2
specific surface: 99 m$^2$/g
porosity: 1.18 ml/g The component B also has a form and dimensions similar to those of the support.

POLYMERISATION

The component B of the catalytic system is mixed with the component A (triethyl aluminium) so as to give an Al(Ti+V) atomic ratio of about 70/1.

The catalyst is used in a polymerisation test in suspension in heptane, the reaction being carried out in two continuous stages in series.

More particularly, in the first polymerisation reactor the reaction is carried out at 90° C. and at a pressure of 9 kg/cm² (80% hydrogen, 20% ethylene) and in the second reactor at 60° C. and at a pressure of 4 kg/cm² (78% ethylene, 14% hydrogen and 8% propylene). During the polymerisation, the concentration of the polymer in the respective heptane suspension is maintained at about 250 g/l and the ratio by weight of the quantity of prepolymer produced in the first reactor to the quantity of polymer produced in the second reactor is maintained at about 1.4:1, with a total residence time in the two reactors of the order of 5 hours.

Under these conditions a polymer of ethylene is obtained with a productivity of 16 kg per gram of catalyst, in the form of granules with average dimensions of 1,500 microns, and with the following characteristics:

melt-index at 190° C.: 0.2 g/10' (ASTM D 1238)
absolute density: 0,954 g/ml (ASTM D 1505)
short chain branching content: about 1% (IR determination)
shearing stress sensitivity ($Q_F$): 125.

The shearing stress sensitivity is the ratio of the melt-index at 21.6 kg to the melt-index value at 2.16 kg at 190° C.

The data are summarised in Table 1 below, which gives:

ALCOHOL: the type of alcohol used: EtOH (ethanol) and MeOH (methanol)
$R_1$: weight ratio of the total alcohol content to the magnesium chloride in the solution which is subjected to spray drying
$R_2$: ethanol/methanol weight ratio in the solution
$t_1$ (°C.): temperature in degrees centigrade of the nitrogen flow at the inlet to the spray drier
$t_2$ (°C.): temperature in degrees centigrade of the nitrogen flow at the outlet from the spray drier
%EtOH: percentage by weight of ethanol in the support
$R_3$: ethanol/methanol weight ratio in the support
$R_4$: titanium tetrachloride/support weight ratio in the preparation of the component B of the catalytic system
$R_5$: vanadium tetrachloride/support weight ratio in the preparation of the component B of the catalytic system
$R_6$: titanium tetrachloride/vanadium tetrachloride weight ratio in the preparation of the component B of the catalytic system
%Ti: percentage by weight of titanium (in terms of the metal) in the component B of the catalytic system
%V: percentage by weight of V (in terms of metal) in the component B of the catalytic system
$R_7$: titanium/vanadium weight ratio in the component B of the catalytic system
PROD: productivity expressed as kg of polymer produced per gram of catalyst
MI: melt-index of the polymer produced
$Q_F$: shearing stress sensitivity of the polymer produced.

EXAMPLE 2 (comparison)

The support is prepared similarly to example 1, 100 kg of magnesium chloride being dissolved in 100 kg of ethanol. The other conditions of example 1 is being used, a granular solid is obtained in the form of spherical particles 80% of which have a diameter within the range 50–60 microns.

The other characteristics of the particles are:
apparent density: 0.28 g/ml
alcoholic hydroxyl group content: 23.5% by weight as ethanol
specific surface: 5 m²/g
porosity: 0.85 ml/g
pore radius: from 100 to 30,000 Angstroms.

The preparation of the component B of the catalytic system is carried out in a similar manner to example 1, the support being treated with only titanium tetrachloride. Thus the component B is obtained with the following characteristics:

form and dimensions of the particles: similar to those of the support
titanium content: 2.6% by weight expressed as the metal
specific surface: 60 m²/g
porosity: 0.8 ml/g The polymerisation is carried out in a similar manner to example 1 above, the component A (triethylaluminium) being mixed with the component B (prepared as described) so as to give an Al/Ti atomic ratio of about 70/1. The polymerisation being carried out as in example 1, an ethylene polymer is obtained with a productivity of 20 kg per gram of catalyst, in the form of granules with average dimensions of 1,600 microns, with the following characteristics:

melt-index at 190° C.: 0.08 g/10'
absolute density: 0,956 g/ml
shearing stress sensitivity ($Q_F$): 68

EXAMPLE 3 (COMPARISON)

The support is prepared in a similar manner to example 1, 100 kg of magnesium chloride being dissolved in 100 kg of methanol. The other conditions described in example 1 being used, a granular solid is obtained in the form of spherical particles, 80% of which have a diameter within the range 40 to 50 microns. The other characteristics of the particles are:

apparent density: 0.35 g/ml
alcoholic hydroxyl group content: 10% by weight as methanol
specific surface: 15 m²/g
porosity: 0.5 ml/g
pore radius from 100 to 10,000 Angstroms.

The preparation of the component B of the catalytic system is carried out in a similar manner to Example 1, the support being treated as described, but with only titanium tetrachloride. Thus the component B of the catalytic system is obtained with the following characteristics:

form and dimensions of the particles similar to those of the support
titanium content: 1.8% by weight as the metal
specific surface: 85 m²/g
porosity: 0.56 ml/g The polymerisation is carried out in a similar manner to example 1 above, the component A (treithylaluminium) being mixed with the component B (prepared as described) so as to give an Al/Ti atomic ratio of about 70/1.

The polymerisation is carried out as in example 1 to give an ethylene polymer with a productivity of 12 kg per gram of catalyst, in the form of granules with average dimensions of 1,000 microns, with the following characteristics:

melt-index at 190° C.: 0.08 g/10'
shearing stress sensitivity ($Q_F$): 70

EXAMPLES 4 TO 14

100 Kg of commercial magnesium chloride dissolved in ethanol or methanol or mixtures of the two, as indicated in Table 1, are loaded into the autoclave of example 1 which is operated at 120° C. and under pressure of nitrogen.

The solution obtained is supplied at the temperature of 120° C. to the NIRO CLOSE CYCLE SPRAY DRIER where the solution is broken down into liquid droplets with the use of a two-fluid type pneumatic nozzle, with a nitrogen gas flow through the nozzle of 200 m³/hour and with a liquid flow rate of 35 l/hour. Moreover, the apparatus is operated in equi-counterflow with the nitrogen temperature at the inlet and at the outlet as given in Table 1.

Thus the component B of the catalytic system is obtained with the titanium content or titanium and vanadium content given in Table 1.

The component B thus obtained is added to heptane containing the component A (triethylaluminium) of the catalytic system so as to give an Al/Ti or Al/(Ti-V) atomic ratio of about 50:1.

Polymerisation is carried out in an autoclave under agitation, at a pressure of 5 kg/cm² (65% ethylene and 35% hydrogen) for one hour at 65° C. The values of the productivity as well as the melt-index and the shearing force sensitivity ($Q_F$) of the polymer produced are given in Table 1.

Examples 8, 9, 10 and 14 are carried out according to the invention, the others being for comparison.

EXAMPLE 15

The catalyst of example 9 is used in the copolymerisation of ethylene with propylene in the manner described in example 1.

The data are given in Table 1.

compound of aluminium and an activated solid support obtained by spray-drying of a solution of magnesium chloride in a mixture of ethanol and methanol in a weight ratio of ethanol to methanol from 0.5:1 to 2.5:1, to a solid support containing ethanolic and methanolic alcoholic hydroxyl groups in an amount of from 2% to 30% by weight, expressed as the sum of ethanol and methanol content, and then reacting the said solid support with a titanium halide and a vanadium halide in the presence of an inert diluent, at a temperature of from 20° C. to 120° C., for a period of time of from 2 to 120 minutes, so to fix to the said solid support an amount of from 0.7% to 12% by weight (expressed as the sum of the metals) of titanium and vanadium, the weight ratio of titanium to vanadium being from 0.5:1 to 2.5:1.

2. Method according to claim 1 characterised that the organometallic compound of aluminium is an alkyl aluminium or an alkyl aluminium halide.

3. Method according to claim 1 characterised in that the titanium halide is titanium tetrachloride or titanium tetrabromide.

4. Method according to claim 1 characterised in that the vanadium halide is vanadium tetrachloride or vanadium oxychloride.

5. Method according to claim 1 characterised in that the titanium halide and vanadium halide are separately reacted with the said solid support.

6. Method according to claim 5 characterised in that the said solid support is reacted before with titanium halide and then with vanadium halide.

7. Method according to claim 6 characterised in that the vanadium halide is reacted at a temperature of from 60° C. to 120° C. for a period of time of from 20 to 120 minutes.

8. Method according to claim 1 characterised in that the organometallic aluminium compound and the said activated solid support are reacted in quantities such as to ensure in the mixture an aluminium to (titanium+vanadium) atomic ratio in the range of from 10.1 to 1,000:1.

TABLE 1

| Ex | Alcohol | $R_1$ | $R_2$ | $t_1$ (°C.) | $t_2$ (°C.) | % EtOH | % MeOH | $R_3$ | $R_4$ | $R_5$ | $R_6$ | % Ti | % V | $R_7$ | PROD | MI | $Q_F$ |
|---|---|---|---|---|---|---|---|---|---|---|---|---|---|---|---|---|---|
| 1 | EtOH + MeOH | 1 | 1.5 | 350 | 200 | 14.2 | 7 | 2 | 0.17 | 0.18 | 0.95 | 2 | 0.9 | 2.2 | 16 | 0.2 | 125 |
| 2 | EtOH | 1 | — | 350 | 200 | 23.5 | — | — | 0.17 | — | — | 2.6 | — | — | 20 | 0.08 | 68 |
| 3 | MeOH | 1 | — | 350 | 200 | — | 10 | — | 0.17 | — | — | 1.8 | — | — | 12 | 0.08 | 70 |
| 4 | EtOH + MeOH | 2 | 15 | 380 | 220 | 14 | 2.3 | 6 | 1.5 | — | — | 2.45 | — | — | 12 | 0.2 | 49 |
| 5 | EtOH | 8 | — | 350 | 220 | 12 | — | — | 1.5 | — | — | 2 | — | — | 15 | 0.2 | 35 |
| 6 | EtOH | 8 | — | 350 | 220 | 12 | — | — | 1.5 | 0.5 | 3 | 1.7 | 0.8 | 2.1 | 11 | 0.34 | 70 |
| 7 | EtOH | 8 | — | 350 | 220 | 12 | — | — | — | 1.5 | — | — | 3.3 | — | 6 | 0.45 | 50 |
| 8 | EtOH + MeOH | 1 | 0.9 | 280 | 170 | 18 | 12 | 1.5 | 1.5 | 1.5 | 1 | 2 | 2.4 | 0.8 | 9 | 0.24 | 95 |
| 9 | EtOH + MeOH | 1 | 0.5 | 280 | 160 | 7.5 | 15 | 0.5 | 1.5 | 0.9 | 1.67 | 2.4 | 2 | 1.2 | 10 | 0.22 | 80 |
| 10 | EtOH + MeOH | 1 | 0.5 | 280 | 160 | 7.5 | 15 | 0.5 | 1.5 | 1 | 1.5 | 2 | 2 | 1 | 8 | 0.25 | 97 |
| 11 | EtOH + MeOH | 8 | 10 | 380 | 190 | 16 | 4 | 4 | 1.5 | — | — | 2.8 | — | — | 11 | 0.25 | 55 |
| 12 | EtOH | 8 | — | 350 | 220 | 12 | — | — | 3 | 1 | 3 | 7.6 | 1.0 | 7.6 | 10 | 0.3 | 65 |
| 13 | EtOH | 8 | — | 350 | 220 | 12 | — | — | 1 | 1.5 | 0.67 | 1.2 | 2.4 | 0.5 | 8 | 0.32 | 75 |
| 14 | EtOH + MeOH | 1 | 0.8 | 350 | 220 | 8 | 6 | 1.3 | 1.5 | 1 | 1.5 | 1.8 | 1.4 | 1.28 | 8 | 0.24 | 98 |
| 15 | EtOH + MeOH | 1 | 0.5 | 250 | 160 | 7.5 | 15 | 0.5 | 1.5 | 0.9 | 1.67 | 2.4 | 2 | 1.2 | 15 | 0.17 | 104 |

We claim:

1. Method of preparing a supported Ziegler-catalyst, active in the polymerisation of alpha-olefins, characterised by reacting in an inert solvent an organometallic